United States Patent [19]

Baumhöfer et al.

[11] Patent Number: 5,308,416
[45] Date of Patent: May 3, 1994

[54] VEHICLE TIRE

[75] Inventors: Johannes Baumhöfer; Joachim Bellut; Dionysius Poque; Helmut Rickling, all of Aachen, Fed. Rep. of Germany

[73] Assignee: Uniroyal Englebert Reifen GmbH, Aachen, Fed. Rep. of Germany

[21] Appl. No.: 710,785

[22] Filed: Feb. 17, 1994

[30] Foreign Application Priority Data

Dec. 4, 1990 [DE] Fed. Rep. of Germany ....... 9016454

[51] Int. Cl.⁵ ............................................. B60C 11/11
[52] U.S. Cl. ................................................ 152/209 R
[58] Field of Search .................... 152/209 R, 209 D; D12/146, 147

[56] References Cited

U.S. PATENT DOCUMENTS

| | | | |
|---|---|---|---|
| D. 279,366 | 6/1985 | Takehara | D12/147 |
| D. 286,274 | 10/1986 | Davis et al. | D12/146 |
| D. 288,191 | 2/1987 | Nakagawa et al. | D12/147 |
| D. 295,035 | 4/1988 | Hinrichsen | D12/147 |
| D. 304,434 | 11/1989 | Schüller | D12/146 |
| 4,057,089 | 11/1977 | Johannsen | 152/209 R |
| 4,298,046 | 11/1981 | Herbelleau et al. | 152/209R |

FOREIGN PATENT DOCUMENTS

| | | | |
|---|---|---|---|
| 0339335 | 11/1989 | European Pat. Off. | 152/209 D |
| 0134315 | 6/1988 | Japan | 152/209 R |

*Primary Examiner*—Michael W. Ball
*Assistant Examiner*—Nancy T. Krawczyk
*Attorney, Agent, or Firm*—Robert W. Becker

[57] ABSTRACT

A vehicle tire of a radial carcass construction with a low cross-sectional profile having a tread portion that is reinforced by a belt layer is provided. The tread portion comprises two circumferential tread element bands in a center portion of the tire tread and a respective tread element row on the shoulder portion. The tread element bands are separated from one another and from the tread element rows in an axial direction of the vehicle tire by respective wide and deep circumferential grooves that have straight edges. The tread element bands have notches that are distributed in a circumferential direction of the vehicle tire and are oriented at a slant relative to a center plane of the vehicle tire. The notches begin at the circumferential grooves and end within the tread element bands. The tread element rows comprise transverse tread elements that are separated from one another by continuous transverse grooves and are arranged transverse relative to the tread element bands.

The tread element bands are provided with narrow grooves that are distributed in the circumferential direction, spaced relative to one another by twice a circumferential length of a tread element repeating unit, defined by the shoulder tread elements and are slanted at a first angle relative to the center plane. The narrow grooves are essentially as deep and ¼ to ⅓ as wide as the circumferential grooves. The transverse grooves each have a bent portion in the vicinity of the circumferential grooves, whereby the bent portion is oriented at a second angle relative to the center plane, whereby the second angle is greater than the first angle of the narrow grooves.

8 Claims, 2 Drawing Sheets

VEHICLE TIRE

BACKGROUND OF THE INVENTION

The present invention relates to a vehicle tire of a radial carcass construction with a low cross-sectional profile having a tread portion that is reinforced by a belt layer. The tread portion comprises two circumferential tread element bands in a center portion of the tread portion and a respective shoulder tread element row on the shoulders of the tread portion. The tread element bands are separated from one another and from the shoulder tread element rows in an axial direction of the vehicle tire by respective wide and deep circumferential grooves that have straight edges. The tread element bands have notches that are distributed in a circumferential direction of the vehicle tire and are oriented at a slant relative to a center plane of the vehicle tire. The notches begin at the circumferential grooves and end within the tread element bands. The shoulder tread element rows comprise transverse tread elements that are separated from one another by transverse grooves and are arranged transverse relative to the tread element bands.

A tire tread of the aforementioned kind has been known from U.S. Pat. No. 4,387,754. The quality requirements for such vehicle tires of a radial carcass construction with a low cross-sectional profile include: excellent general driving characteristics, good performance on wet roads, and low noise emission of the tread portion. In order to realize these demands which are partially contradictory, a certain tread design is required. It has been demonstrated that wide tire treads, in general, exhibit excellent driving characteristics.

It is therefore an object of the present invention to improve the performance of vehicle tires especially on wet roads and reduce the noise emission by providing a suitable tire tread.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The vehicle tire of the present invention is primarily characterized by tread element bands which are provided with narrow grooves that are distributed in the circumferential direction, spaced relative to one another by twice a circumferential length of a tread element repeating unit or pitch defined by the shoulder or transverse tread elements in the circumferential direction, and are slanted at a first angle relative to a center plane of the vehicle tire, whereby the narrow grooves are essentially as deep and ¼ to ⅓ as wide as the circumferential grooves, and whereby the transverse grooves of the shoulder tread element rows each have a bent portion in the vicinity of the circumferential grooves. The bent portion is oriented at a second angle relative to the center plane, whereby the second angle is greater than the first angle of the narrow grooves.

Preferably, the first angle is 45° to 30° and the second angle is 85° to 60°, whereby the bent portion and the narrow grooves are slanted in the same direction. In a further embodiment, the narrow grooves of the adjacent tread element bands are aligned relative to one another.

In another embodiment, the tread element bands are provided with a respective circumferential narrow groove that is ⅔ as deep and ¼ to ⅓ as wide as circumferential grooves. The circumferential narrow groove may be disposed at a center line of a respective tread element band or off-center relative to the center line. This means that the circumferential narrow groove may divide the treat element bands, for example, in a 50:50 or 70:30 or 30:70 ratio.

Furthermore, the tread elements of the tread element bands and the transverse tread elements of the shoulder tread element rows may be provided with fine cuts or sipes, whereby the transverse tread elements may also have further narrow grooves. Preferably, a respective end of the transverse grooves, that is facing away from the center plane of the tire, opens axially outwardly in a funnel-shaped manner.

Due to the inventive design and arrangement of the grooves and notches within the tire tread, comprising slanted narrow grooves and circumferential narrow grooves as well as ends of the bent portions of the transverse grooves in the shoulder portion that are aligned relative to the slant of the narrow grooves, a high drainage, an excellent performance on wet roads and a low noise emission are ensured.

DESCRIPTION OF PREFERRED EMBODIMENTS

The present invention will now be described in detail with the aid of several specific embodiments utilizing FIGS. 1 and 2.

Figure 1:
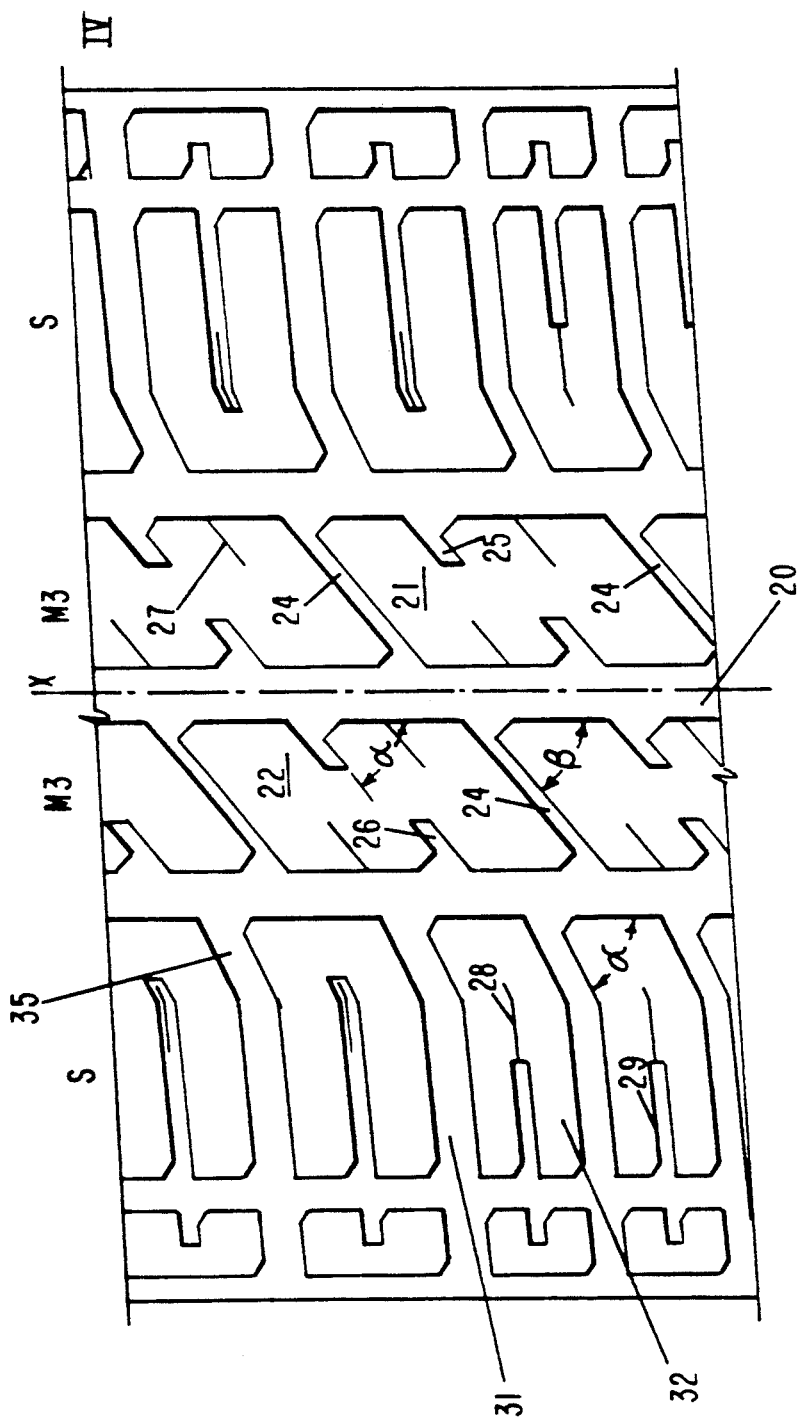
FIG. 1 is a plan view of an inventive tire tread.

The tire tread according to FIG. 1 is comprised of two tread element bands M3 in the center portion and one respective shoulder tread element row S in each of the shoulders of the tread portion. The tread element bands M3 are separated from one another and from the shoulder tread element rows S in an axial direction of the vehicle tire by respective wide and deep circumferential grooves 20 that have straight edges.

The tread element bands M3 are provided with narrow grooves 24 that are distributed in the circumferential direction, spaced relative to one another by twice a circumferential length of a tread element repeating unit (pitch) defined by the transverse tread elements (shoulder tread elements) in the circumferential direction, and are slanted at an angle $\beta$ relative to a center plane x—x of the vehicle tire. The narrow grooves 24 are essentially as deep and ¼ to ⅓ as wide as the circumferential grooves 20. The narrow grooves 24 connect the separated circumferential grooves 20.

The width of the narrow grooves 24 may be in the range of 1 to 4 mm and the depth may be up to 7 mm. In addition to these narrow grooves 24, the tread element bands M3 are also provided with notches 25, 26, that alternate relative to a center line of a respective tread element band M3 and are slanted at an angle relative to the center plane x—x. The notches 25, 26 begin at the circumferential grooves 20 and end within the tread element bands M3. They are slanted at an angle $\alpha$ relative to the center plane x—x of the vehicle tire, with two of the alternating notches 25, 26 being disposed between two neighboring ones of the narrow grooves 24. The angle $\alpha$ preferably corresponds to the angle $\beta$ of the narrow grooves 24.

Depending on the size of the tire, the width of the circumferential groove 20 in the center plane x—x is preferably in the range of 7 to 12 mm. The angle β at which the narrow grooves 24 are slanted relative to the center plane x—x is preferably in the range of 45° to 30°. The narrow grooves 24 of neighboring tread element bands M3 are aligned relative to one another.

The shoulder tread element rows S of the shoulder portion of the tire tread comprise transverse tread elements 32 that are separated from one another by transverse grooves 31 and are arranged transverse relative to the tread element bands M3. The transverse grooves 31 of the shoulder tread element rows S each have a bent portion 35 in the vicinity of the respective circumferential grooves 20. The bent portion 35 is oriented at an angle δ relative to the center plane x—x. The angle δ is greater than the angle β of the narrow grooves 24 and is preferably in the range of 85° to 60°.

Figure 2:
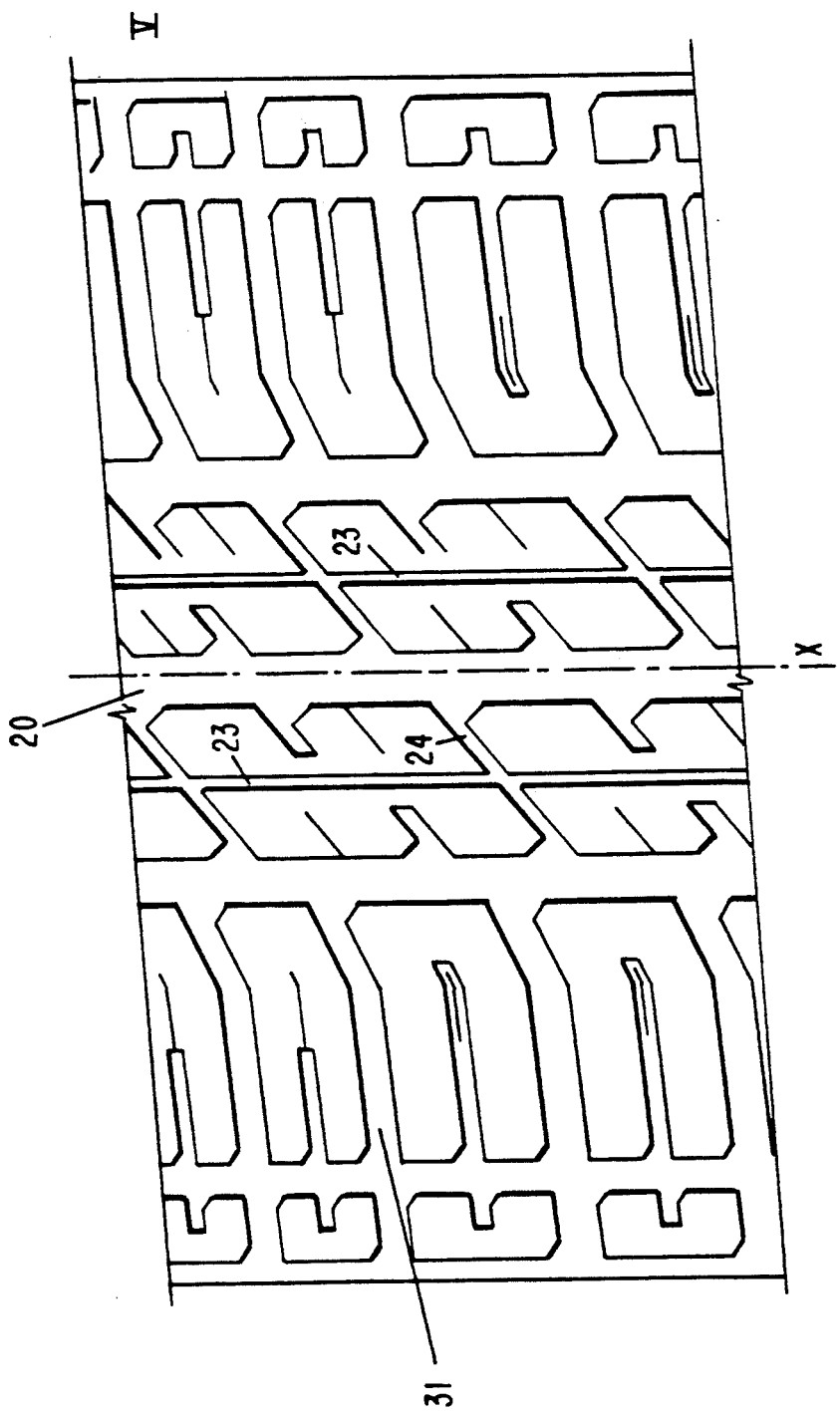
FIG. 2 shows a different embodiment.

The tire tread according to FIG. 2 is essentially identical to the embodiment represented in FIG. 1, with the exception that the tread element bands M3 are provided with a respective circumferential narrow groove 23. The narrow groove 23 is provided with straight edges and may be disposed at the center line of the respective tread element band M3 or off-center relative to the center line. The width of the circumferential narrow groove 23 is approximately ¼ to ⅓ of the width of the circumferential groove 20, and the depth of the circumferential narrow groove 23 is up to ¾ of the depth of the circumferential groove 20.

Due to such a groove system, that comprises circumferential grooves 20 with a deep and a wide cross-section and slanted narrow grooves 24 as well as circumferential narrow grooves 23 in the center portion of the tire tread, and slanted transverse grooves 31 with a respective bent portion in the shoulder portion of the tire tread, the accordingly manufactured tire exhibits an excellent performance on wet roads and a low noise emission.

Additionally, the tread elements 21, 22 and the transverse tread elements 32 may be provided with fine cuts or sipes 27 respectively 28. The transverse tread elements may also be provided with further narrow notches 29. The fine cuts 27, 28 (so-called lamellas) as well as the narrow notches 29 within the transverse tread elements 32 are slanted relative to the center plane x—x. Preferably, the edges of the narrow grooves 24, the notches 25, 26, 29 and the transverse grooves 31 are provided in a slanted fashion.

With the inventive tire tread design, the vehicle tire according to the present invention demonstrates a generally excellent driving performance at high speeds, whereby good drainage properties, a good performance on wet roads and a low noise emission are also achieved.

The present invention is, of course, in no way restricted to the specific disclosure of the specification, examples and drawings, but also encompasses any modifications within the scope of the appended claims.

What we claim is:

1. In a vehicle tire of a radial carcass construction with a low cross-sectional profile having a tread portion that is reinforced by a belt layer, whereby said tread portion comprises two circumferential tread element bands in a center portion of said tread portion and a respective shoulder tread element row on shoulders of said tread portion; said tread element bands are separated from one another and from said shoulder tread element rows in an axial direction of said vehicle tire by respective wide and deep circumferential grooves that have straight edges; said tread element bands have notches that are distributed in a circumferential direction of said vehicle tire and are oriented at a slant relative to a center plane of said vehicle tire; said notches begin at said circumferential grooves and end within said tread element bands; said shoulder tread element rows comprise transverse tread elements that are separated from one another by transverse grooves and are arranged transverse relative to said tread element bands; the improvement wherein:

said tread element bands are provided with narrow grooves that are spaced relative to one another by twice a circumferential length of a tread element repeating unit defined by said transverse tread elements in said circumferential direction, and are slanted at a first angle relative to said center plane, with said narrow grooves communicating with said circumferential grooves and being essentially as deep and ¼ to ⅓ as wide as said circumferential grooves, and with said transverse grooves of said shoulder tread element rows each having a bent portion in the vicinity of said circumferential grooves, whereby said bent portion is oriented at a second angle relative to said center plane, with said second angle being greater than said first angle of said narrow grooves; and said notches of a respective one of said tread element bands alternate relative to a circumferential center line of said respective tread element band and are slanted at a third angle relative to said center plane, with two alternating ones of said notches being disposed between two neighboring ones of said narrow grooves.

2. A vehicle tire according to claim 1, wherein said first angle is 45° to 30° and said second angle is 85° to 60°, whereby said bent portion and said narrow grooves are slanted in a same direction.

3. A vehicle tire according to claim 1, wherein said narrow grooves of a first one of said tread element bands are aligned relative to said narrow grooves of a second one of said tread element bands.

4. A vehicle tire according to claim 1, wherein said tread element bands are provided with a respective circumferential narrow groove that is ¾ as deep and ¼ to ⅓ as wide as said circumferential grooves.

5. A vehicle tire according to claim 4, wherein said circumferential narrow groove is disposed at a center line of a respective one of said tread element bands.

6. A vehicle tire according to claim 4, wherein said circumferential narrow groove is off-center relative to a center line of a respective one of said tread element bands.

7. A vehicle tire according to claim 1, wherein tread elements of said tread element bands and said transverse tread elements of said shoulder tread element rows are provided with fine cuts, whereby said transverse tread elements have further narrow notches.

8. A vehicle tire according to claim 1, wherein a respective end of said transverse grooves, that is facing away from said center plane, opens axially outwardly in a funnel-shaped manner.

* * * * *

UNITED STATES PATENT AND TRADEMARK OFFICE
CERTIFICATE OF CORRECTION

PATENT NO. : 5,308,416
DATED : May 3, 1994
INVENTOR(S) : Baumhöfer et al

It is certified that error appears in the above-identified patent and that said Letters Patent is hereby corrected as shown below:

On the title page, item (22) Filed: Feb. 17, 1994 should read --

[22] Filed:   June 5, 1991 --.

Signed and Sealed this

Thirtieth Day of August, 1994

Attest:

BRUCE LEHMAN

Attesting Officer

*Commissioner of Patents and Trademarks*